Dec. 22, 1925.                                                 1,566,619
                          H. G. A. SCHLOSSARECK
                                FLYTRAP
                           Filed July 28, 1925
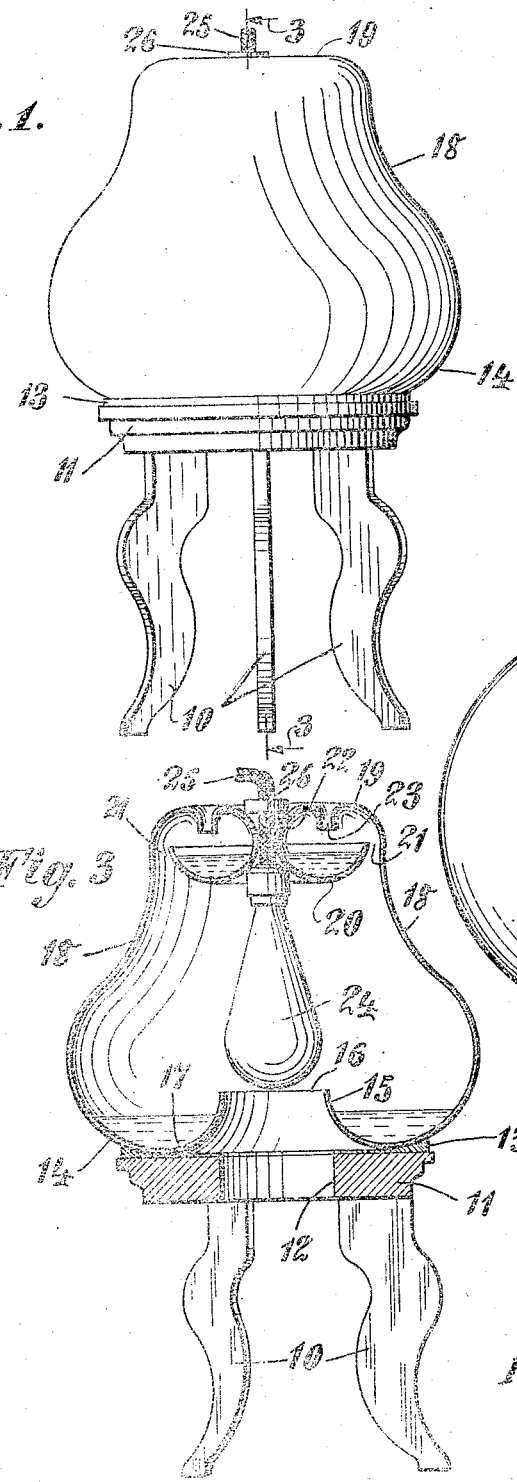
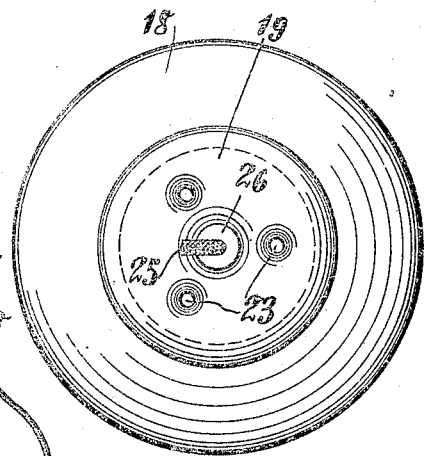
INVENTOR
Hugo. G. A. Schlossareck
BY
Maurice Ebering
ATTORNEY Patented Dec. 22, 1925.

1,566,619

UNITED STATES PATENT OFFICE.

HUGO G. A. SCHLOSSARECK, OF YONKERS, NEW YORK.

FLYTRAP.

Application filed July 28, 1925. Serial No. 46,536.

*To all whom it may concern:*

Be it known that I, HUGO G. A. SCHLOSSARECK, a citizen of the United States, residing at Yonkers, in the county of Westchester and State of New York, have invented certain new and useful Improvements in Flytraps, of which the following is a specification.

This invention relates to improvements in devices for entrapping flies and like winged insects and has as one of its objects to provide a fly catcher of ornamental appearance, capable of continuous operation and readily cleaned when desired.

A further feature is the provision of a light within the structure which serves to attract winged insects in a well known manner, several openings being provided through which the insects may enter to be retained therein.

Another aim is to provide a fly catcher in the form of a transparent bulb having interior compartments to retain a liquid in which the insects eventually become drowned.

These several objects are attained by the novel design, construction and combination of parts hereinafter described and shown in the accompanying drawing, forming an essential part of this disclosure, and in which:—

Figure 1 is a side elevational view showing a complete embodiment of the invention.

Figure 2 is a top plan view of the same.

Figure 3 is a vertical sectional view taken on line 3—3 of Figure 1.

As shown in the drawing, the device comprises a stand having legs 10 to rest upon a table or other convenient support, these legs being fixed at their upper ends to a circular plate 11 having an ornamental edge and containing a central opening 12 passing therethrough.

On the plate 11 is a thin marginal seat 13 concave on its upper surface to receive the curved annular base 14 of the body of the device, the base being curved upwardly, as at 15 surrounding a central opening 16 in register with the opening in the plate 11.

Thus the base presents an annular channel 17, the outer walls 14 curving convergingly, as at 18, as they approach the top 19, where they are curved re-entrantly to form an interior annular channel 20, the outer edge of which is spaced from the outer wall 18, as at 21.

The inner wall of the channel presents a central space 22, and formed in the flat top 19 are openings having downwardly extending nipples 23 directed to the center of the channel 20.

An electric lamp, represented by the bulb 24, may be passed upwardly through the openings 12 and 16 into the hollow interior of the body, the conducting cord 25 passing out of the opening 22 to any convenient socket, and the lamp is held suspended by a collar 26 fixed on the conductor.

The globe constituting the body of the device (parts 14 to 20 inclusive) is preferably made of colored glass, so that the lamp rays will show through to attract insects, which lighting on the body, eventually find their way into the interior through the passages in the nipples 23.

The annular channels 17 and 20 are partially filled with water, preferably salt water, into which the insects drop and end their activities.

From the foregoing it will be seen that an effective device for diminishing pestiferous insects has been set forth in the preferred form of its embodiment, and that the device presents a neat and attractive appearance.

What I claim as new is:—

A fly catcher comprising a colored transparent globe having annular interior channels in its upper and lower portions, said channels to contain liquid, hollow nipples leading from the top of said globe to the channel in its upper portion, said globe having a relatively large opening in its base and a smaller opening in its top interjacent the respective channels, an electric lamp enterable through the bottom opening, the cord of said lamp passing through the top opening, means on said cord to suspend the lamp, and a stand for supporting the base of said globe.

In witness whereof I have affixed my signature.

HUGO G. A. SCHLOSSARECK.